April 26, 1932.   R. A. McCARTY   1,855,720
CLUTCH MOTOR
Filed Feb. 8, 1930
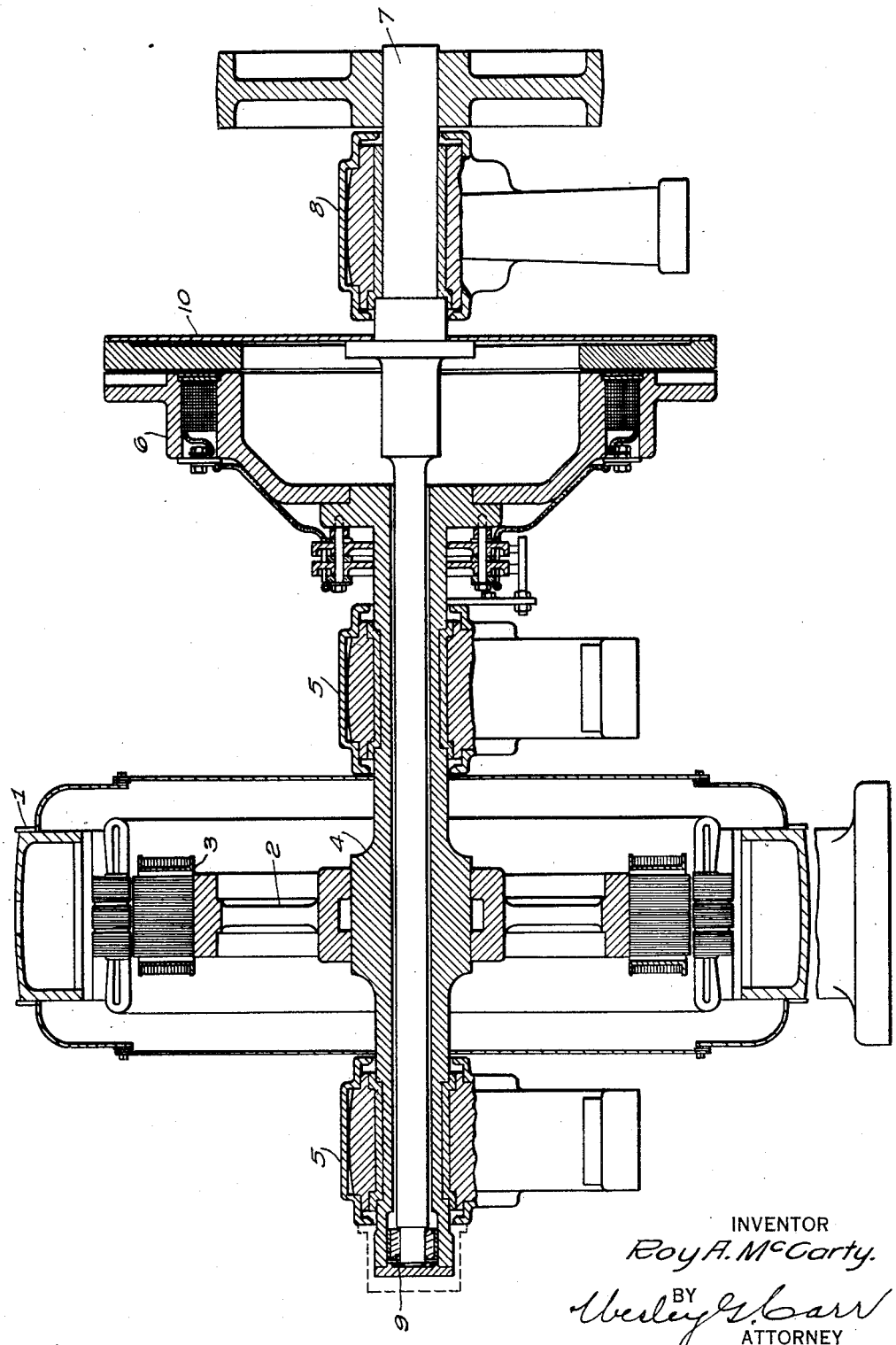
INVENTOR
Roy A. McCarty.
BY
ATTORNEY Patented Apr. 26, 1932

1,855,720

UNITED STATES PATENT OFFICE

ROY A. McCARTY, OF WILKINSBURG, PENNSYLVANIA, ASSIGNOR TO WESTINGHOUSE ELECTRIC & MANUFACTURING COMPANY, A CORPORATION OF PENNSYLVANIA

CLUTCH MOTOR

Application filed February 8, 1930. Serial No. 427,038.

My invention relates to an improved clutch motor and more particularly to a mounting for the same.

In many instances where motors of low starting torque are used, such as synchronous motors which have inherently low starting torque, or other motors which, due to limitation of starting current, have an inherently low starting torque, they are first started and brought up to speed before being connected to the load. Such motors are known as clutch motors.

Prior to my invention, a clutch motor usually had its rotor rotatably mounted, by means of roller bearings, on a shaft directly connected to the load, and had magnetic clutch means between the spiders of the rotor and an element on the shaft to connect the two together after the motor had been brought up to speed. However, many undesirable features were characteristic of a motor of the above specified type, the chief of which was the instability of the roller bearings between the rotor and the load shaft. Since the rotor and the load shaft normally rotated as a unit, the rollers of the bearing were not caused to roll around the shaft but stayed in one position. In this position, they were subject to a pounding action during the rotating of the rotor. This pounding action eventualy caused the rollers to form grooves either in the shaft or in the housing or in both, and eventually caused sufficient play to put the motor out of commission.

A further disadvantage of clutch motors of this type lay in the difficulty of making repairs to, or to replace, the bearings after they become worn, for, since the bearings supported the entire weight of the rotor, it was necessary to totally disassemble the motor in order to make repairs to the bearings.

My invention is intended to avoid the specified difficulties by eliminating loaded bearings between the rotor and the load shaft.

It is an object of my invention to produce an improved clutch motor.

A further object of my invention is to provide an improved mounting for a clutch motor.

Further objects and advantages of my invention will be apparent from the following detailed disclosure in conjunction with the drawing, in which the single figure is a vertical sectional view of a motor embodying my invention.

In the drawing, the apparatus disclosed comprises a frame 1 carrying the stationary parts of a motor. Rotatably mounted within the frame 1 are the rotary elements of the motor, comprising a rotor-spider carrying the pole pieces 3, and mounted on a hollow shaft 4 carried by a standard pedestal bearing 5 at each end of the motor. The hollow shaft has affixed, near one end thereof, one element 6, usually the field element of a magnetic clutch, which is thus mounted exteriorly of the bearings. Extending through the opening of the hollow shaft and coaxial therewith is a load shaft 7 which is supported in a standard bearing 8 external to the hollow rotor shaft 4. However, the load shaft 7 extends through the hollow rotor shaft 4 and is journaled therein by means of a roller bearing 9 which is placed at the end of the hollow shaft 4 farthest removed from the clutch element 6, to insure that the end of the load shaft shall have full support and also to permit ready access to the roller bearing of the load shaft, to make any necessary repairs without, in any way, dismantling or disturbing the motor proper. Adjacent to the clutch element 6 of the rotor shaft 4, the load shaft 7 carries a cooperating element 10 of a magnetic clutch, usually the pole pieces of such a clutch.

The operation of my device is as follows:

The magnetic clutch being disengaged, starting current is applied to the motor to bring it up to speed, at which time, energy is applied to the clutch to close the same and connect the motor to the load while the motor is rotating at its proper load speed. In this manner, the load is started by the machine while at full speed and, consequently, at full torque. The weight of the rotor is supported, at all times, by the standard pedestal bearings at the ends of the motor frame. The load shaft, extending through the hollow shaft, is substantially unloaded, and the bearing between the load shaft and the hollow shaft is also substantially unloaded, inasmuch as this bearing carries only the load caused by that end of the load shaft disposed within the hollow rotor shaft. Also, in case this roller bearing becomes damaged by wear, it is at an open end of the shaft in such position that it is a simple matter to withdraw it and substitute a new bearing, which is not true of clutch motors of the older type, in which it was necessary to totally dismantle the motor before a new bearing could be inserted.

I claim as my invention:

1. A clutch motor comprising an outer stator member, an inner rotor member, a hollow shaft for the rotor member, pedestal bearings to support the hollow shaft, a load shaft extending into the hollow shaft, a bearing in the hollow shaft for the end of the load shaft, bearing means to support the load shaft exterior to the hollow shaft and means to detachably connect the load shaft and hollow shaft.

2. A mounting for the rotor of a clutch motor comprising a hollow shaft supporting the rotor of the motor, bearings for supporting the hollow shaft, a clutch element mounted on one end of the hollow shaft, a load shaft extending through the hollow shaft and journaled therein, a bearing for the load shaft in proximity to, and accessible from, the end of the hollow shaft remote from said clutch element, and a clutch member on the load shaft to cooperate with the clutch element on the hollow shaft.

3. A clutch motor comprising a stator and a rotor, a hollow shaft for the rotor, a supporting bearing for the hollow shaft at each end of the rotor, a magnetic clutch element mounted on one end of the hollow shaft exteriorly of the bearings, a load shaft journaled in said hollow shaft, a bearing in proximity to the other end of the hollow shaft to support the load shaft and an element on said load shaft to cooperate with said magnetic clutch element to enable the hollow shaft and the load shaft to be locked to rotate as a unit.

In testimony whereof, I have hereunto subscribed my name this 20th day of January, 1930.

ROY A. McCARTY.